United States Patent
Son et al.

(10) Patent No.: US 10,449,923 B2
(45) Date of Patent: Oct. 22, 2019

(54) ROOF AIRBAG FOR VEHICLE

(71) Applicants: Hyundai Motor Company, Seoul (KR); Kia Motors Corp., Seoul (KR); Hyundai Mobis Co., Ltd., Seoul (KR)

(72) Inventors: Yu Ji Son, Hwaseong-si (KR); Seok Min Lee, Seongnam-si (KR); Byung Ho Min, Yongin-si (KR); Hea Kwon Park, Yongin-si (KR); Kyu Sang Lee, Yongin-si (KR)

(73) Assignees: Hyundai Motor Company, Seoul (KR); Kia Motors Corp., Seoul (KR); Hyundai Mobis Co., Ltd., Seoul (KR)

( * ) Notice: Subject to any disclaimer, the term of this patent is extended or adjusted under 35 U.S.C. 154(b) by 113 days.

(21) Appl. No.: 15/804,876

(22) Filed: Nov. 6, 2017

(65) Prior Publication Data

US 2019/0016292 A1 Jan. 17, 2019

(30) Foreign Application Priority Data

Jul. 12, 2017 (KR) .................. 10-2017-0088547

(51) Int. Cl.
*B60R 21/233* (2006.01)
*B60R 21/214* (2011.01)
(Continued)

(52) U.S. Cl.
CPC .......... *B60R 21/233* (2013.01); *B60R 21/214* (2013.01); *B60R 21/262* (2013.01);
(Continued)

(58) Field of Classification Search
CPC ... B60R 21/213; B60R 21/214; B60R 21/233; B60R 21/2334; B60R 21/262; B60R 2021/23192; B60R 2021/2612
See application file for complete search history.

(56) References Cited

U.S. PATENT DOCUMENTS 4,421,342 A * 12/1983 Brown, Jr. .............. B60R 21/02
280/740
5,752,713 A * 5/1998 Matsuura ................ B60R 21/21
280/730.1
(Continued)

FOREIGN PATENT DOCUMENTS

DE 198 51 469 A1 * 5/2000 ... B60R 2021/23192
KR 10-0512863 B1 8/2005

*Primary Examiner* — Frank B Vanaman
(74) *Attorney, Agent, or Firm* — Morgan, Lewis & Bockius LLP

(57) ABSTRACT

A roof airbag for a vehicle may include an inflator at a first end portion of a front and a rear end portions of a sunroof frame configured to discharge deployment gas when activated; a reinforcement member connecting a first and a second side of the sunroof frame at a position between the front and the rear end portions of the sunroof frame; and an airbag cushion at the first end portion of the front and the rear end portions of the sunroof frame in a folded state, and configured with a first chamber configured to cover from the first end portion of the front and the rear end portions of the sunroof frame to a position before reaching the reinforcement member and a second chamber configured to cover from the reinforcement member to the second end portion of the front and the rear end portions of the sunroof frame.

11 Claims, 7 Drawing Sheets

(51) Int. Cl.
  *B60R 21/262*  (2011.01)
  *B60R 21/231*  (2011.01)
  *B60R 21/261*  (2011.01)
(52) U.S. Cl.
  CPC .............. *B60R 2021/23192* (2013.01); *B60R 2021/2612* (2013.01)

(56) References Cited

U.S. PATENT DOCUMENTS

| | | | | |
|---|---|---|---|---|
| 6,042,147 | A * | 3/2000 | Nishijima | B60R 21/217 280/731 |
| 6,189,960 | B1 * | 2/2001 | Mumura | B60J 7/0015 160/7 |
| 6,457,740 | B1 * | 10/2002 | Vaidyaraman | B60R 21/231 280/730.2 |
| 2002/0005634 | A1 * | 1/2002 | Alb | B60R 21/20 280/730.2 |
| 2003/0178824 | A1 * | 9/2003 | Ogata | B60R 21/213 280/730.2 |
| 2004/0100073 | A1 * | 5/2004 | Bakhsh | B60R 21/213 280/730.1 |
| 2004/0239084 | A1 * | 12/2004 | Mori | B60R 21/214 280/730.1 |
| 2009/0174174 | A1 * | 7/2009 | McCoy | B60R 21/0132 280/749 |
| 2017/0015269 | A1 * | 1/2017 | Min | B60R 21/214 |
| 2018/0162315 | A1 * | 6/2018 | Lee | B60R 21/2346 |

* cited by examiner

ROOF AIRBAG FOR VEHICLE

CROSS-REFERENCE(S) TO RELATED APPLICATIONS

The present application claims priority to Korean Patent Application No. 10-2017-0088547, filed on Jul. 12, 2017, the entire contents of which is incorporated herein for all purposes by this reference.

BACKGROUND OF THE INVENTION

Field of the Invention

The present invention relates to a roof airbag for a vehicle, and, more particularly, to a roof airbag for a vehicle which is configured and formed to smoothly deploy an airbag cushion along a sunroof frame of the vehicle.

Description of Related Art

An airbag for a vehicle is a safety device which is configured to deploy an airbag cushion to alleviate an impact which is applied to occupants when a collision occurs, and the airbag for the vehicle includes a driver airbag (DAB), a passenger airbag (PAB), a side airbag (SAB), a curtain airbag (CAB), a knee airbag (KAB), a roof airbag (RAB), and the like.

When a roof of the vehicle has a panoramic structure, the roof is more easily damaged than a vehicle which omits the panoramic roof structure, and thus injury to an occupant may increase or the occupant internally ricochets off the vehicle due to damage of the roof.

Specifically, performance of the RAB is influenced by a deployment speed of the airbag cushion, and, as the airbag cushion rapidly covers a sunroof, possibility of injury to an occupant or ejection of the occupant from the vehicle can be reduced.

The information disclosed in this Background of the Invention section is only for enhancement of understanding of the general background of the invention and should not be taken as an acknowledgement or any form of suggestion that this information forms the related art already known to a person skilled in the art.

BRIEF SUMMARY

Various aspects of the present invention are directed to providing a roof airbag (RAB) for a vehicle, which is configured for improving a deployment speed of an airbag cushion to maximize protection performance of the RAB by forming the airbag cushion, which covers a sunroof frame, to be separated into a plurality of chambers around a reinforcement member which is formed at the sunroof frame.

An aspect of the present invention is directed provide an RAB for a vehicle, which includes an inflator provided at a first end portion of a front end portion of a sunroof frame and a rear end portion thereof, and configured to discharge deployment gas when actuating; a reinforcement member provided to connect both end portions of the sunroof frame to each other at a position between the front and rear end portions of the sunroof frame; and an airbag cushion provided at the first end portion of the front end portion of the sunroof frame and the rear end portion thereof in a folded state, configured to receive the deployment gas supplied from the inflator and deploying to cover the sunroof frame, and configured with a first chamber configured to cover from the first end portion of the front end portion of the sunroof frame and the rear end portion thereof to a position before reaching the reinforcement member and a second chamber configured to cover from the reinforcement member to the second end portion of the front end portion of the sunroof frame and the rear end portion thereof.

The RAB may further include a fixed bracket configured to space away the inflator from the airbag cushion, which is folded, by a predetermined distance in a state in which the inflator is parallel to the airbag cushion, and fix the inflator to a vehicle body; and a gas guider configured to connect the inflator and the first chamber of the airbag cushion and supply the deployment gas of the inflator to the first chamber.

An external sewing line may be formed at the airbag cushion to separate the first chamber from the second chamber and to communicate between the first chamber and the second chamber.

The external sewing line may form a connection path configured to communicate between the first chamber and the second chamber, and the connection path may be formed to extend internally within the first chamber by a predetermined length.

An inlet, which is configured to receive the deployment gas supplied from the inflator, and a 'U'-shaped first guide sewing line, which is formed at a position which is separated from the inlet by a predetermined distance and is configured to guide the flow of deployment gas to both sides of the first chamber and then to flow in a different direction from the first end portion of the sunroof frame or the rear end portion thereof, may be formed at the first chamber.

The connection path of the external sewing line may be formed at a position corresponding to an intermediate position of the first guide sewing line in a width direction of the vehicle.

The RAB may further include a diffuser disposed internally within the first chamber and having one end portion connected to the gas guider and configured to receive the deployment gas supplied from the gas guider and the other end portion branching off to both the sides of the first chamber and formed in a T-shape to distribute the deployment gas.

A 'U'-shaped second guide sewing line, which is formed at a position which is spaced away from the connection path by a predetermined distance and is configured to guide the flow of deployment gas to both sides of the second chamber and then to flow in a different direction from the front end portion of the sunroof frame or the rear end portion thereof, may be formed at the second chamber.

The RAB may further include an anti-sagging cover having a first end portion fixed to the vehicle body and a second end portion formed in an L-shape and configured to support a downward portion of the airbag cushion which is folded.

The RAB may further include a guide bar formed along both the sides of the sunroof frame, configured to pass through a plurality of connectors that are formed at both sides of the airbag cushion, and configured to guide the airbag cushion to slide along the sunroof frame when the inflator operates.

Each of the plurality of connectors may be disposed with a coupler integrally or monolithically provided at one of both the sides of the airbag cushion and formed in a hook shape, and a ring including a metal material is coupled to the coupler, inserted into the guide bar, and configured to slide according to an actuation of the inflator.

The RAB may further include a plurality of guide holders, each of which has a first end portion coupled to the sunroof frame and a second end portion at which a through-hole is formed at allow the guide bar to pass through the through-hole and to be coupled to the plurality of guide holders, wherein the plurality of guide holders are coupled to both end portions of the guide bar.

A nut may be engaged with each of both the end portions of the guide bar, preventing the plurality of guide holders from escaping from the guide bar.

In accordance with the RAB for a vehicle, which is configured with the structure as described above, the deployment speed of the airbag cushion may be prevented from being impeded by the reinforcement member which is formed at the sunroof frame wherein the airbag may be rapidly deployed to improve protection performance for occupants.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
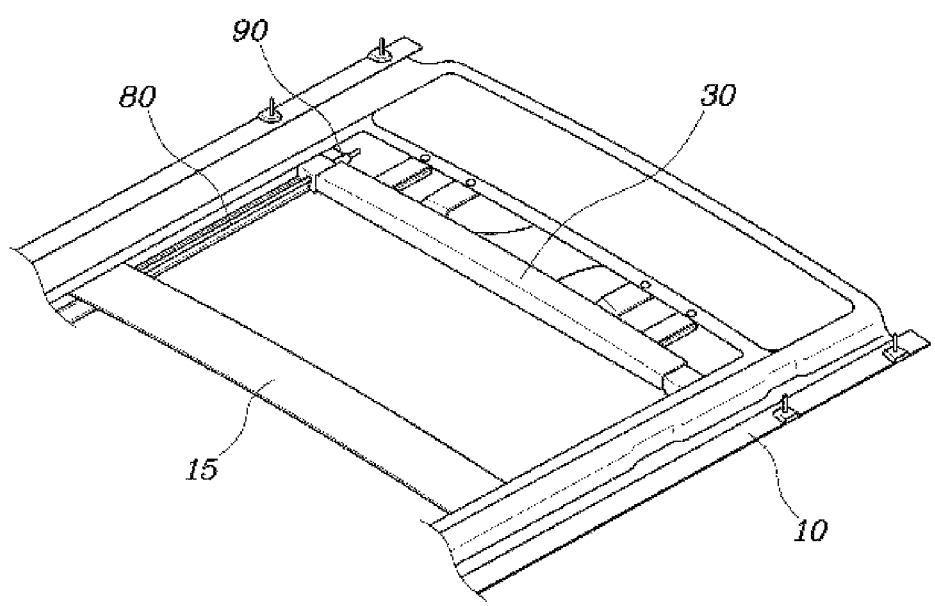
FIG. 1 is a perspective view illustrating a roof airbag (RAB) for a vehicle according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in portion by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents, and other embodiments, which may be included within the spirit and scope of the invention as defined by the appended claims.

Figure 2:
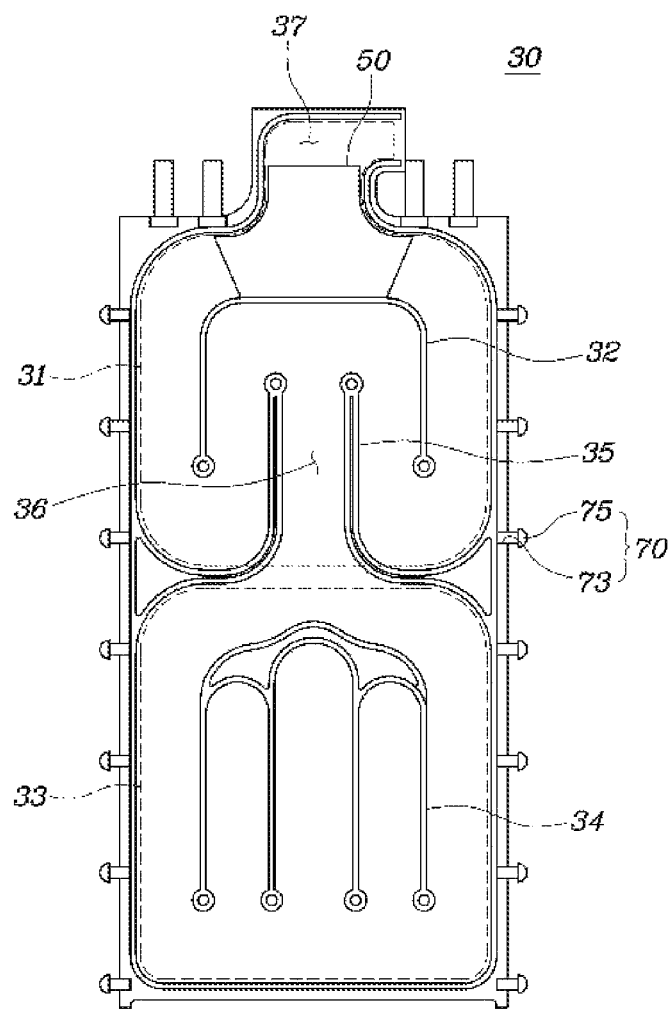
FIG. 2 is a detailed diagram illustrating a shape of an airbag cushion according to an exemplary embodiment of the present invention.
Figure 3:
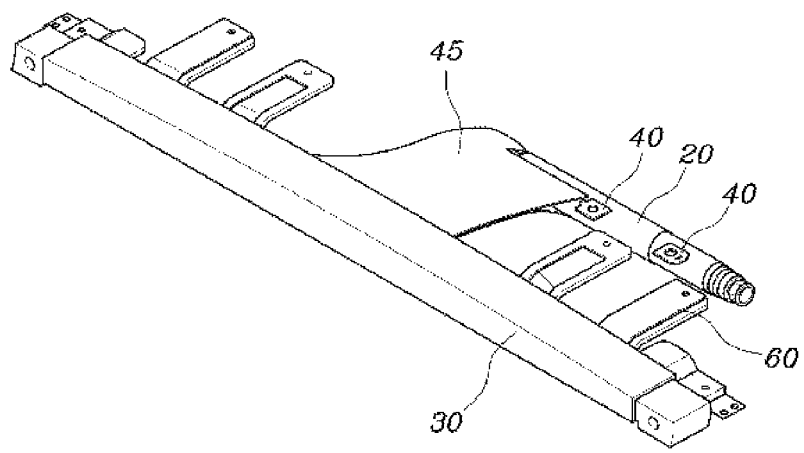
FIG. 3 is a detailed perspective view illustrating a connection relationship of an inflator, a fixed bracket, a gas guider, and the airbag cushion according to an exemplary embodiment of the present invention.

FIG. 1 is a perspective view illustrating an RAB for a vehicle according to an exemplary embodiment of the present invention, FIG. 2 is a detailed diagram illustrating a shape of an airbag cushion according to an exemplary embodiment of the present invention, and FIG. 3 is a detailed perspective view illustrating a connection relationship of an inflator, a fixed bracket, a gas guider, and the airbag cushion according to exemplary embodiment of the present invention.

Referring to FIG. 1, FIG. 2, and FIG. 3, the RAB for the vehicle may include an inflator 20 disposed at one end portion of a front end portion and a rear end portion of a sunroof frame 10 and configured to discharge deployment gas when activated, a reinforcement member 15 configured to connect both sides of the sunroof frame 10 to each other at a position between the front end portion and the rear end portion of the sunroof frame 10, and an airbag cushion 30 disposed at the first end portion of the front end portion and the rear end portion of the sunroof frame 10 in a state of being folded, configured to receive the deployment gas supplied from the inflator 20 and to be deployed to cover the sunroof frame 10, and configured with a first chamber 31 configured to cover from the first end portion of the front end portion and the rear end portion of the sunroof frame 10 to a position before reaching the reinforcement member 15, and a second chamber 33 configured to cover from the reinforcement member 15 to the other end portion of the front end portion and the rear end portion of the sunroof frame 10.

In the RAB for a vehicle according to an exemplary embodiment of the present invention, the sunroof frame 10 is formed at a vehicle roof and is configured to allow a sunroof module to be mounted on the vehicle roof, and, at the present point, the reinforcement member 15 is disposed between the front end portion and the rear end portion of the sunroof frame 10 to connect both the sides of the sunroof frame 10 to each other wherein a rigidity of the sunroof frame 10 may be increased.

In addition, the inflator 20 is disposed to a first side of the front end portion and the rear end portion of the sunroof frame 10, and is configured to actuate during a vehicle roll-over and supply the deployment gas to the airbag cushion 30. At the present moment, the airbag cushion 30 is also provided to one end portion of the front end portion and the rear end portion of the sunroof frame 10 in association with the inflator 20, wherein a length of a deployment gas path connecting the inflator 20 to the airbag cushion 30 may be minimized.

For example, when the inflator 20 is disposed to the front end portion of the sunroof frame 10, the airbag cushion 30 may be disposed to the front end portion of the sunroof frame 10 to be deployed to the rear end portion of the sunroof frame 10 when the inflator 20 actuates. On the other hand, when the inflator 20 is disposed to the rear end portion of the sunroof frame 10, the airbag cushion 30 may be provided to be deployed in a direction from the rear end portion of the sunroof frame 10 to the front end portion thereof.

The RAB for a vehicle according to an exemplary embodiment of the present invention is provided for that the airbag cushion 30 is formed with the first chamber 31 and the second chamber 33.

The first chamber 31 is provided to cover from one end portion of the front end portion and the rear end portion of the sunroof frame 10 to the position before reaching the reinforcement member 15, and the second chamber 33 is provided to cover from the reinforcement member 15 to the other end portion of the front end portion and the rear end portion of the sunroof frame 10.

That is, when the inflator 20 actuates, the first chamber 31 is deployed and deployed to the position before reaching the reinforcement member 15 and then the second chamber 33 is deployed from the reinforcement member 15 to a position where the reinforcement member 15 faces toward the sunroof frame 10, wherein interference of the reinforcement member 15 may be reduced when the airbag cushion 30 is deployed. A detailed description thereof will be described below.

Meanwhile, the RAB for a vehicle according to an exemplary embodiment of the present invention may further include a fixed bracket 40 configured to space away the inflator 20 from the airbag cushion 30, which is folded, by a predetermined distance in a state in which the inflator 20 is parallel to the airbag cushion 30 while fixing the inflator 20 to a vehicle body, and a gas guider 45 configured to connect the inflator 20 and the first chamber 31 of the airbag cushion 30 and supply the deployment gas of the inflator 20 to the first chamber 31.

That is, as shown in FIG. 1 and FIG. 3, the inflator 20 is fixed to the roof of the vehicle body or the sunroof frame 10 by the fixed bracket 40, and the gas guider 45 is configured to supply the deployment gas of the inflator 20 to the first chamber 31 of the airbag cushion 30, wherein the airbag cushion 30 disposed to the roof may be deployed when the inflator 20 actuates.

At the present point, the inflator 20 may be disposed to be parallel to the airbag cushion 30, and the gas guider 45 may be bent in an L-shape to connect the inflator 20 to the airbag cushion 30 which are disposed to be parallel to each other, and may be connected to the first chamber 31 of the airbag cushion 30 in a direction which is perpendicular thereto.

In addition, the gas guider 45 may be connected to an intermediate position of the airbag cushion 30 in a width direction of the vehicle to uniformly deploy both sides of the airbag cushion 30.

However, the above-described shape of the gas guider 45 and the position thereof connecting to the airbag cushion 30 are merely described to enhance understanding of the present invention and is not limited thereto. The position thereof may be varied according to application to the vehicle or a designer.

Meanwhile, referring to FIG. 2, an external sewing line 35 may be formed at the airbag cushion 30 to separate the first chamber 31 from the second chamber 33 and allow communication between the first chamber 31 and the second chamber 33.

That is, the external sewing line 35 is formed at the airbag cushion 30 along an external line thereof, wherein the external sewing line 35 may be formed to extend in the width direction of the vehicle at a position corresponding to the reinforcement member 15 to primarily separate the first chamber 31 from the second chamber 33. Here, a communication region is formed to deliver deployment gas within the first chamber 31 to the second chamber 33.

The external sewing line 35 forms a connection path 36 configured to communicate between the first chamber 31 and the second chamber 33, and the connection path 36 may be formed to extend internally within the first chamber 31 by a predetermined length.

As shown in FIG. 2, the external sewing line 35 is formed to separate the first chamber 31 from the second chamber 33 as well as to allow communication between the first chamber 31 and the second chamber 33, and, at the present point, the connection path 36 communicating the first chamber 31 with the second chamber 33 is configured to extend internally within the first chamber 31 by a second predetermined length, wherein the deployment gas supplied from the inflator 20 within the first chamber 31 may flow into regions of both sides of the connection path 36 and then may be guided to flow to the second chamber 33 through the connection path 36. Accordingly, the first chamber 31 is initially deployed and then the second chamber 33 is deployed wherein a sequential deployment of the airbag cushion 30 may be implemented.

An inlet 37, which is configured to receive the deployment gas supplied from the inflator 20, and a 'U'-shaped first guide sewing line 32, which is formed at a position which is separated from the inlet 37 by a predetermined distance and configured to guide the flow of deployment gas to both sides of the first chamber 31 and then to flow in a different direction from the front end portion or the rear end portion of the sunroof frame 10, may be formed at the first chamber 31.

That is, as shown in FIG. 2, the inlet 37 of the airbag cushion 30 is provided at one side of the front end portion and the rear end portion of the sunroof airbag 30, which is in immediate proximity to the inflator 20 to receive the deployment gas supplied from the inflator 20.

The deployment gas flowing within the first chamber 31 through the inlet 37 flows into both side directions according to the first guide sewing line 32, and then flows into a different direction from a front end portion or a rear end portion of the airbag cushion 30.

Consequently, when the first chamber 31 of the airbag cushion 30 is deployed, since the deployment gas first flows to each both of the sides inside the first chamber 31 at an initial deployment stage, a strong deployment force is generated at each of the sides of the first chamber 31. That is, both of the sides of the first chamber 31 are rapidly and forcefully deployed wherein a deployment speed of the airbag cushion 30 may be prevented from being impeded by an external obstacle or a friction force.

At the provided point, the connection path 36 of the external sewing line 35 may be characterized by being formed at the position corresponding to the intermediate location of the first guide sewing line 32 in the width direction of the vehicle.

That is, as shown in FIG. 2, the connection path 36 of the external sewing line 35 is disposed to face the intermediate position of the inverted 'U'-shaped first guide sewing line 32, wherein the deployment gas flowing from the inflator 20 flows within the first chamber 31 as indicated by arrows.

For example, when assuming that the airbag cushion 30 is deployed from a rear side of the vehicle to a front side thereof, the deployment gas discharged from the inflator 20 is supplied to the inlet 37 of the first chamber 31 and then is distributed in both of the side directions of the first chamber 31 by the first guide sewing line 32. Thereafter, the deployment gas flows to the front side of the vehicle along a region between the external sewing line 35 and the first guide sewing line 32, flows into an internal side direction of the first chamber 31 by the connection path 36 of the external sewing line 35, and then flows to the rear side of the vehicle. Afterward, the deployment gas flows again in the internal side direction of the first chamber 31 by the first guide sewing line 32 and then flows to the second chamber 33 through the connection path 36.

According to such a shape, since the deployment gas of the inflator 20 completely deploys the first chamber 31 and then is supplied to the second chamber 33, the second chamber 33 may receive a sufficient deployment pressure and thus may be rapidly deployed regardless of interference of the reinforcement member 15.

Also, as shown in FIG. 2, the RAB for a vehicle according to an exemplary embodiment of the present invention may further include a diffuser 50 provided internally within the first chamber 31 and having one end portion connected to the gas guider 45 and configured to receive the deployment gas being supplied, and the other end portion branching off to both of the sides of the first chamber 31 and formed in a T-shape to distribute the deployment gas.

Consequently, when the first chamber 31 of the airbag cushion 30 is deployed, the deployment gas supplied through the inlet 37 may be substantially distributed to both of the sides within the first chamber 31 wherein a deployment performance of the airbag cushion 30 may be improved.

Meanwhile, a 'U'-shaped second guide sewing line 34, which is formed at a position spaced away from the connection path 36 by a predetermined distance, is configured to guide the flow of deployment gas to both sides of the second chamber 33 and then to flow in a different direction from the front end portion or the rear end portion of the sunroof frame 10, may be formed at the second chamber 33.

That is, since the second guide sewing line 34 is formed at the second chamber 33, the flow of deployment gas is guided to both of the sides within the second chamber 33 as the same in the first chamber 31. Accordingly, the second chamber 33 may be provided to sufficiently deploy both of the sides thereof at an initial deployment stage and then to deploy intermediate portions of the second chamber 33.

The above-described predetermined distances may be varied according to a designer or a shape of the airbag, and thus are not limited to a specific distance value.

Meanwhile, as another exemplary embodiment, the shape of the first guide sewing line 32 or the second guide sewing line 34 within the airbag cushion 30 may be varied.

Figure 4:
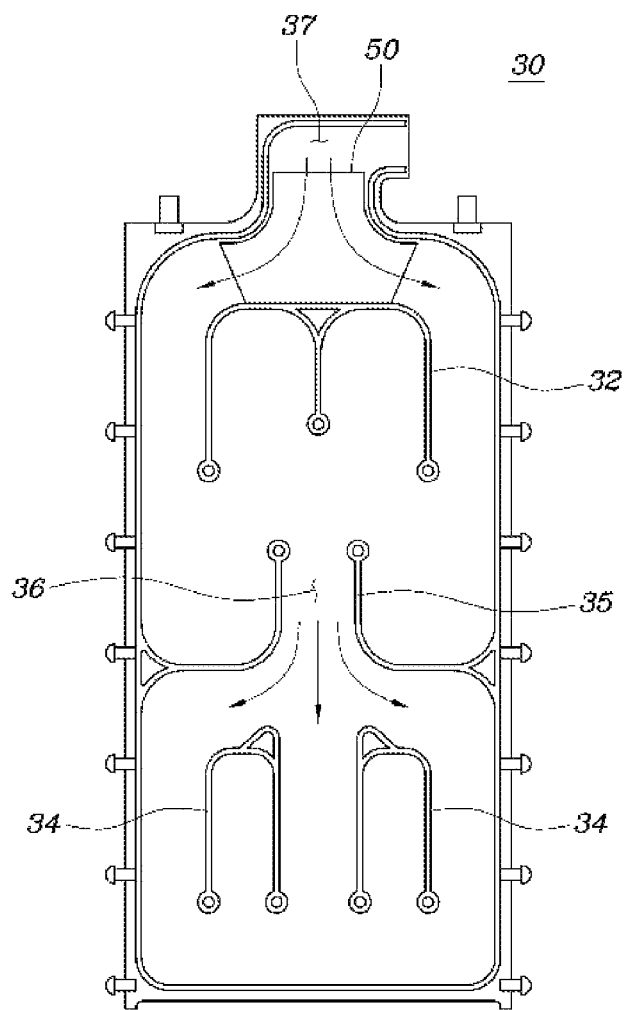
FIG. 4 is a detailed diagram illustrating a shape of an airbag cushion according to another exemplary embodiment of the present invention.

FIG. 4 is a detailed diagram illustrating a shape of an airbag cushion 30 according to another exemplary embodiment of the present invention. When comparing FIG. 2 with FIG. 4, as in the present exemplary embodiment illustrated in FIG. 4, the first guide sewing line 32 may be provided in a shape in which a plurality of U-shapes are overlapped with each other. Also, the external sewing line 35 may be varied to shorten the second length of which the connection path 36 extends when compared to that of the above-described embodiment of FIG. 2. Furthermore, as shown in FIG. 4, the second guide sewing line 34 may be formed to be separated and deploy the deployment gas in both of the side directions within the second chamber 33 as well as a central side of the second chamber 33, increasing a deployment speed at a center portion of the second chamber 33 relative to those in both of the side directions thereof.

As is described above, the shape of the sewing lines of the airbag cushion 30 are varied and applied wherein a deployment shape of the airbag with a characteristic required by the designer may be implemented.

Meanwhile, the RAB for a vehicle according to an exemplary embodiment of the present invention may further include an anti-sagging cover 60 having a first side fixed to the vehicle body and a second side formed in an L-shape and configured to support a downward portion of the airbag cushion 30 which is folded.

Figure 5:
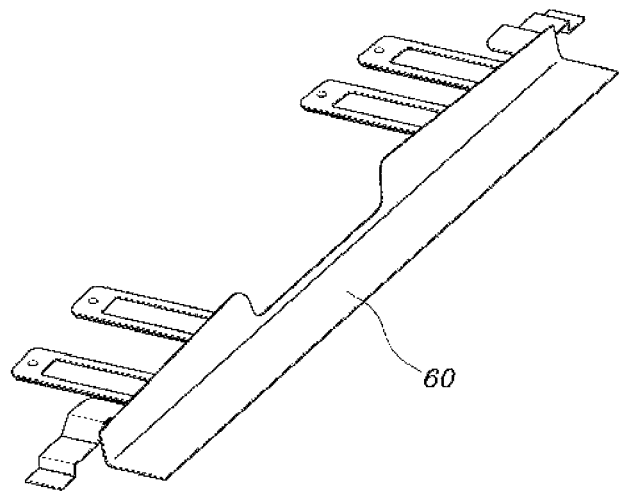
FIG. 5 is a detailed perspective view illustrating an anti-sagging cover according to an exemplary embodiment of the present invention.

FIG. 5 is a detailed perspective view illustrating the anti-sagging cover 60 according to an exemplary embodiment of the present invention. As shown in FIG. 3 and FIG. 5, a shape configured to be bolt-engaged with the vehicle body is formed at the first side of the anti-sagging cover 60, and an L-shaped seating portion on which the folded airbag cushion 30 is accommodated is formed at the second side of the anti-sagging cover 60.

That is, since the airbag cushion 30, implementing the RAB for a vehicle, is disposed to the roof of the vehicle, a sagging phenomenon of the airbag cushion 30 may occur due to gravity. When the airbag cushion 30 sags, an internal aesthetic appeal of the vehicle is degraded as well as newfound difficulty in deploying the airbag cushion 30 in a proper direction occurs.

Consequently, the airbag cushion 30 may be prevented from sagging through the anti-sagging cover 60, improving the deployment performance of the airbag cushion 30.

In addition, referring to FIG. 1 and FIG. 2, the RAB for a vehicle according to an exemplary embodiment of the present invention may further include a guide bar 80 formed along both of the sides of the sunroof frame 10, passing through a plurality of connectors 70 formed at both of the sides of the airbag cushion 30, and configured to guide the airbag cushion 30 to slide along the sunroof frame 10 when the inflator 20 actuates.

That is, the guide bar 80 is formed extend along both side surfaces of the sunroof frame 10 allowing the airbag cushion 30 to be deployed along the sunroof frame 10. Both end portions of the guide bar 80 may be provided to be coupled to either the sunroof frame 10 or the vehicle body.

In an exemplary embodiment of the present invention, each of the first chamber 31 and the second chamber 33 of the airbag cushion 30 are configured to allow the flow of deployment gas to both of the sides within each of the first chamber 31 the second chamber 33 by the sewing lines, and since the connectors 70 of the airbag cushion 30 are provided at both of the sides of each of the first chamber 31 and the second chamber 33 to slide along the guide bar 80, when the inflator 20 actuates the connectors 70 of the airbag cushion 30 may rapidly forcibly slide along the guide bar 80.

Accordingly, the deployment speed of the airbag cushion 30 may be prevented from being impeded by the friction force between the connectors 70 and the guide bar 80.

Figure 6:
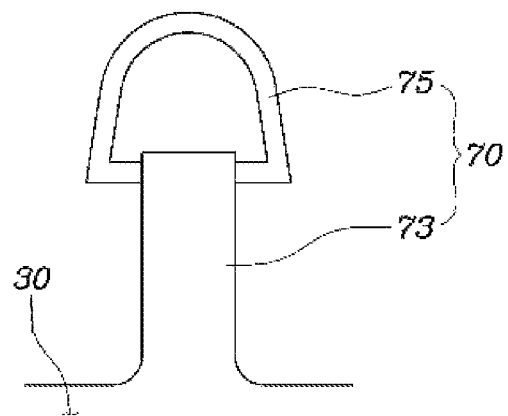
FIG. 6 is a detailed diagram illustrating a connector of the airbag cushion according to an exemplary embodiment of the present invention.

FIG. 6 is a detailed diagram illustrating each of the plurality of connectors 70 of the airbag cushion 30 according to an exemplary embodiment of the present invention. Referring to FIG. 6, each of the plurality of connectors 70, according to an exemplary embodiment of the present invention, may be formed with a coupler 73 integrally or monolithically provided at one of both of the sides of the airbag cushion 30 and formed in a hook shape, and a ring 75 including a metal material is coupled to the coupler 73 and inserted into the guide bar 80, sliding according to the activation of the inflator 20.

That is, rather than the hook-shaped coupler 73, which is integrally or monolithically formed with the airbag cushion 30, being directly inserted into the guide bar 80, the ring 75, which includes the metal material, is configured to slide on the guide bar 80 with the coupler 73, wherein when the airbag cushion 30 is deployed, the deployment speed of the airbag cushion 30 may be minimized from being impeded by the friction force between the connectors 70 and the guide bar 80.

Here, the ring 75 may be formed in a semicircular or circular shape and may be provided to be coupled to the coupler 73 as well as to slide along the guide bar 80 that passes through the ring 75.

Figure 7:
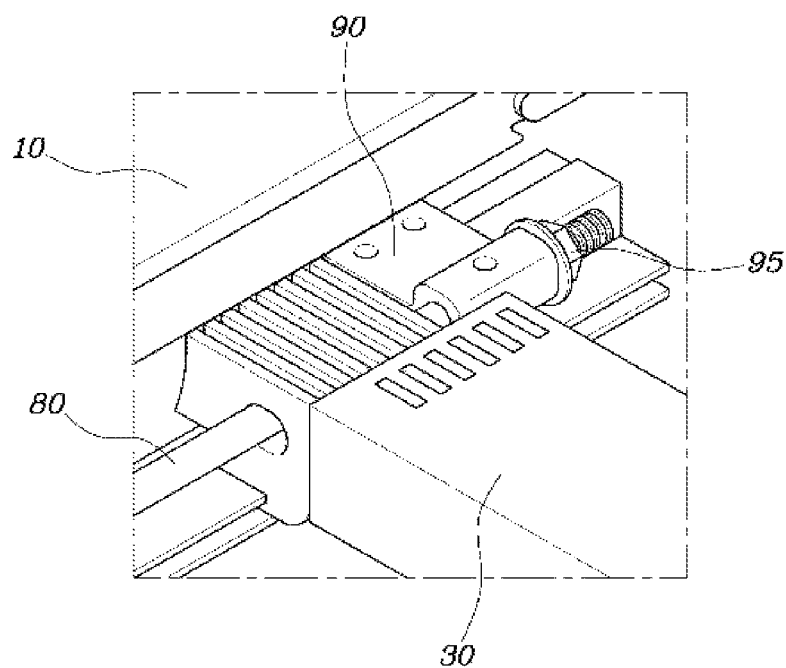
FIG. 7 and FIG. 8 are detailed perspective views each illustrating a first and second end portions of a guide bar according to an exemplary embodiment of the present invention.
Figure 8:
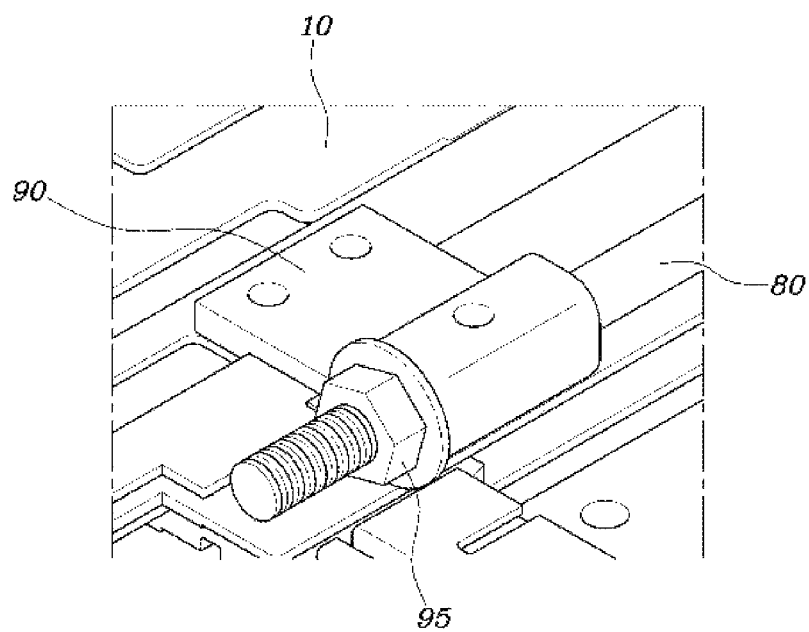

Meanwhile, FIG. 7 and FIG. 8 are detailed perspective views each illustrating both the end portions of the guide bar 80 according to an exemplary embodiment of the present invention. Referring to FIG. 7 and FIG. 8, the RAB for a vehicle according to an exemplary embodiment of the present invention may further include a plurality of guide holders 90 which each have one end portion coupled to the sunroof frame 10 and a second end portion at which a through-hole is formed allowing the guide bar 80 to pass therethrough and be coupled to the plurality of guide holders 90, and each of the plurality of guide holders 90 may be coupled to both of the end portions of the guide bar 80.

When FIG. 7 illustrates a front end side of the sunroof frame 10, FIG. 8 illustrates a rear end side of the sunroof frame 10, and when FIG. 7 illustrates the rear end side of the sunroof frame 10, FIG. 8 illustrates the front end side of the sunroof frame 10.

Each of the plurality of guide holders 90 is provided to allow the guide bar 80 to be fixed to the sunroof frame 10, and one end portion of each of the plurality of guide holders 90 is bolt-engaged with the sunroof frame 10 and the second end portion thereof allows the guide bar 80 to be inserted thereinto.

Here, a nut 95 may be engaged with both of the end portions of the guide bar 80 preventing the plurality of guide holders 90 from escaping from the guide bar 80. Consequently, the airbag cushion 30 may actuate to stably slide along the guide bar 80 which is fixed to the plurality of guide holders 90.

In accordance with the RAB for a vehicle which is configured with the structure as described above, the deployment speed of the airbag cushion may be prevented from being impeded by the reinforcement member which is formed at the sunroof frame wherein the airbag may be rapidly deployed to improve protection performance for occupants.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roof airbag apparatus for a vehicle, the apparatus comprising:
    an inflator disposed at a first end portion of one of a front end portion of a sunroof frame and a rear end portion of the sunroof frame and configured to discharge deployment gas when activated;
    a reinforcement member configured to connect a first side and a second side of the sunroof frame to each other at a position between the front end portion of the sunroof frame and the rear end portion thereof;
    an airbag cushion provided at the first end portion of the one of the front end portion of the sunroof frame and the rear end portion thereof in a state of being folded, configured to receive the deployment gas supplied from the inflator and deploy to cover the sunroof frame, and configured with a first chamber to cover from the first end portion of the one of the front end portion of the sunroof frame and the rear end portion thereof to a position before reaching the reinforcement member and a second chamber to cover from the reinforcement member to a second end portion of the other of the front end portion of the sunroof frame and the rear end portion thereof; and
    a guide bar formed along both of the first and second sides of the sunroof frame, configured to pass through a plurality of connectors that are formed at a first side and a second side of the airbag cushion, and guiding the airbag cushion to slide along the sunroof frame when the inflator actuates,
    wherein each of the plurality of connectors is provided with a coupler integrally formed at one of the first side or the second side of the airbag cushion and formed in a hook shape, and a ring, including a metal material, is coupled to the coupler and inserted into the guide bar, sliding according to the activation of the inflator.

2. The roof airbag apparatus of claim 1, further including:
    a fixed bracket separating the inflator from the airbag cushion, which is folded, by a predetermined distance in a state in which the inflator is in parallel to the airbag cushion and fixing the inflator to a vehicle body; and
    a gas guider connecting between the inflator and the first chamber of the airbag cushion and supplying the deployment gas of the inflator to the first chamber.

3. The roof airbag apparatus of claim 2, wherein an external sewing line is formed at the airbag cushion separating the first chamber from the second chamber and allows communication between the first chamber and the second chamber.

4. The roof airbag apparatus of claim 3, wherein the external sewing line forms a connection path configured to allow communication between the first chamber and the second chamber, and the connection path extends within the first chamber by a predetermined length.

5. The roof airbag apparatus of claim 4, wherein an inlet, which is configured to receive the deployment gas supplied from the inflator, and a 'U'-shaped first guide sewing line, which is formed at a position separated from the inlet by a predetermined distance and is configured to guide the flow of the deployment gas to a first side and a second side of the first chamber and then to flow in a direction of the second end portion from the first end portion of the sunroof frame or the rear end portion of the sunroof frame, are formed at the first chamber.

6. The roof airbag apparatus of claim 5, wherein the connection path of the external sewing line is formed at a position corresponding to an intermediate position of the first guide sewing line in a width direction of the vehicle.

7. The roof airbag apparatus of claim 2, further including:
a diffuser internally disposed within the first chamber and having a first end portion connected to the gas guider and configured to receive the deployment gas supplied from the gas guider and a second end portion branching off to a first side and a second side of the first chamber and formed in a T-shape to distribute the deployment gas.

8. The roof airbag apparatus of claim 5, wherein a 'U'-shaped second guide sewing line, which is formed at a position which is separated from the connection path by a predetermined distance and is configured to guide the flow of the deployment gas to a first side and a second side of the second chamber and then to flow in a direction of the second end portion from the front end portion of the sunroof frame or the rear end portion of the sunroof frame, is formed at the second chamber.

9. The roof airbag apparatus of claim 1, further including:
an anti-sagging cover having a first end portion fixed to a vehicle body and a second end portion formed in an L-shape configured to support a lower portion of the airbag cushion which is folded.

10. The roof airbag apparatus of claim 1, further including:
a plurality of guide holders, each of which has a first end portion coupled to the sunroof frame and a second end portion at which a through-hole is formed allowing the guide bar to pass therethrough and be coupled to the plurality of guide holders,
wherein the plurality of guide holders is coupled to first and second end portions of the guide bar.

11. The roof airbag apparatus of claim 10, wherein a nut is engaged with each of the first and second end portions of the guide bar preventing the plurality of guide holders from escaping from the guide bar.

* * * * *